United States Patent [19]

Tschernenko et al.

[11] Patent Number: 4,636,935

[45] Date of Patent: Jan. 13, 1987

[54] POWER CONTROL SYSTEM

[75] Inventors: Stanley A. Tschernenko, Long Beach; Lawrence A. Crane, Irvine; Jay Boyce, Anaheim, all of Calif.

[73] Assignee: Loyola Controls, Inc., Orange, Calif.

[21] Appl. No.: 669,005

[22] Filed: Nov. 7, 1984

[51] Int. Cl.[4] .............................................. G06F 13/00
[52] U.S. Cl. .................................. 364/140; 318/345 R
[58] Field of Search ................................ 364/140, 141; 318/345 R, 345 E, 345 F, 345 G, 345 H

[56] References Cited

U.S. PATENT DOCUMENTS 4,427,933  1/1984  Wagenor ............................. 318/809
4,567,556  1/1986  Onogi .................................. 364/140

Primary Examiner—Jerry Smith
Assistant Examiner—Allen MacDonald
Attorney, Agent, or Firm—Willie Krawitz

[57] ABSTRACT

A solid state control device is disclosed for controlling power turn-on times to process systems such as heaters used in glassmaking, in petrochemical plants, in furnaces, and for electromotive, and other devices.

A command signal from the process control is fed to the device in either parallel digital, serial digital, or in analogue form. The command signal is then converted to a binary signal suitable for controlling a phase delay counter.

The phase delay counter receives a high frequency clocking signal and produces a very finely divided half cycle output. This provides a line frequency power control signal which is synchronized with command signal. The counter output is fed to gate drivers that actuate a turn-on device such as an SCR or triac to control the process system within a finely divided time period corresponding to a single time division of each half cycle.

15 Claims, 3 Drawing Figures

POWER CONTROL SYSTEM

BACKGROUND OF THE INVENTION

This invention relates to a solid state circuit device for controlling the amount of voltage, current or power to heating, electromotive, and other devices. The device may be used for motor speed controls, in furnaces, for petrochemical plants, in heaters, and in glass processing plants, etc. The device also has particular application for turn-on switching at precise, finely divided time intervals.

Historically, the control of A.C. power has evolved from simple on-off switching to transformer tap changing, and then to thyratrons and SCRs. Initially, the control response time base was in the order of minutes. The subsequent use of discrete and integrated solid state devices has reduced this time base to fractions of a second. However, many types of processes are quite complex, and require a more precise degree of control. Moreover, present day devices are sensitive to noise, frequency, and temperature changes. Hence, digital control techniques are preferred since they are much less sensitive to temperature variations and induced noise.

In addition, it would be desireable to employ an inherently stable digital device that would subdivide a power control cycle into a discrete number of periods. The device could then be turned on within a very closely controlled time period based on a digital selection code. This digital code could be obtained directly from a computer or converted from an analogue command signal. Thus, if a half cycle of power were to be subdivided by a factor of $2^n$, e.g., 256, it would enable the device to be turned on at any one of the precisely defined 256 intervals. Of course, the power cycle could be divided into fewer or greater numbered intervals of $2^n$, depending on the required control resolution.

It would be desireable to provide an operator closed loop, an automatic closed loop, or a computer automated control for the device. This would enable the device to control the process manually, automatically, or by a computer using voltage, current, or power feedback.

It would also be desireable to provide a means for tailoring the response of the device to its control command signal to obtain a desired operating characteristic. One example would be to vary or change the output response so that the command signal could directly require a percentage of RMS current, or in another case, the percentage of average power.

THE INVENTION

According to the invention, a turn-on device for a power control system is provided, comprising: input command signal receiving means from a process system, and the like; means for converting the command signal to digit pulses; memory means for converting the digital input command signals to output digital turn-on command signals; a high frequency clock for subdividing an input power signal into $2^n$ discrete pulses; a phase delay counter for receiving the high frequency clock and the digital turn-on command signals from the memory means, the phase delay counter providing a line synchronized delay corresponding to a discrete pulse signal and synchronized with the digital turn-on command signal; and, an output firing circuit actuated by the phase delay counter upon receipt of a turn-on command signal from the memory means.

If desired, a command interface circuit may be provided to allow either a direct digital connection to a controlling computer, or to conversion of an analogue command signal to the required digital format. Also, an optional analogue signal processor may be provided for closed loop control and limit detection.

Typically, the device is phase locked to the supply frequency by a phase locked loop and a divide down counter. This produces the higher subdivision frequency required by the delay counter. The phase locked loop tracks changes in frequency and automatically adjusts for about 45-75 Hz operation generally, and for 50 or 60 Hz operation, in particular. The processed command word is loaded into a delay counter at the beginning of every half cycle, and the timing is initiated. At a termination point determined by the command word, a firing pulse is generated by the counter. This pulse activates a gating circuit that turns on the appropriate power switching devices for supplying power to the controlled device. These switching devices are preferably SCRs and transistors.

There are several embodiments of the command interface function depending on the requirements of the process system. To satisfy the interface requirements of the bulk of present-day process control systems, an analogue interface is provided. This analogue interface usually accepts industry standard voltage or current command signals, provides offset, gain, and supply voltage compensation, and a soft start feature. The processed analogue signal is then converted to a digital command word suitable for controlling the delay counter by an A/D converter. Where required, a command translation memory is inserted between the A/D converter and the delay counter to produce the response characteristics of the device for the process control system. As an example, using an 8 bit RMS memory, the RMS output voltage of the device enables the command signal to be tracked with a linearity of better than 1% over the 1%-99% power region.

Another embodiment of the invention enables direct connection of the device to a controlling computer using either serial or parallel data communication. Both forms of computer interface enable the addressing of one of a group of controllers connected to the same communication line. If required, they also provide the means to return the command word to the computer for verification along with any additional voltage, current, or power information at the device site.

Another embodiment of the invention enables analogue signal processing to provide closed loop controls, limit detection or generation of on-site feedback information for transmission to a computer. The processing funcation typically accepts AC voltage and current signals from on-site transducers and performs the multiplication, rectification, integration and sampling functions prior to their conversion to digital form by the analogue or computer interface. A presettable overload shutdown is also provided by this function.

Part or all of the functions contained in the device of this invention could be incorporated in one or several custom chips, or in a microprocessor based system.

DESCRIPTION OF THE PREFERRED EMBODIMENTS

Figure 1:
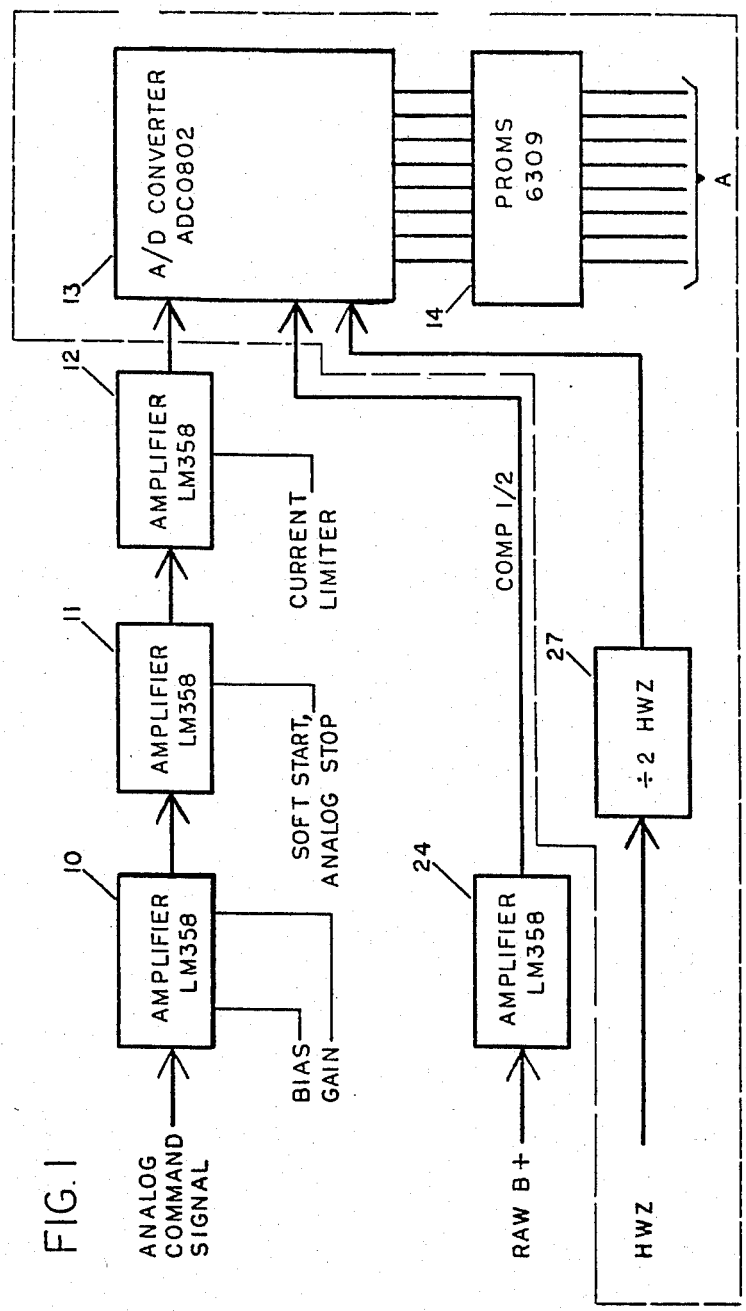
FIGS. 1 and 2 are block diagrams of a preferred turn-on device of this invention; and, FIG. 3 is a block diagram showing various feed back and computer control systems for the device.
Figure 2:
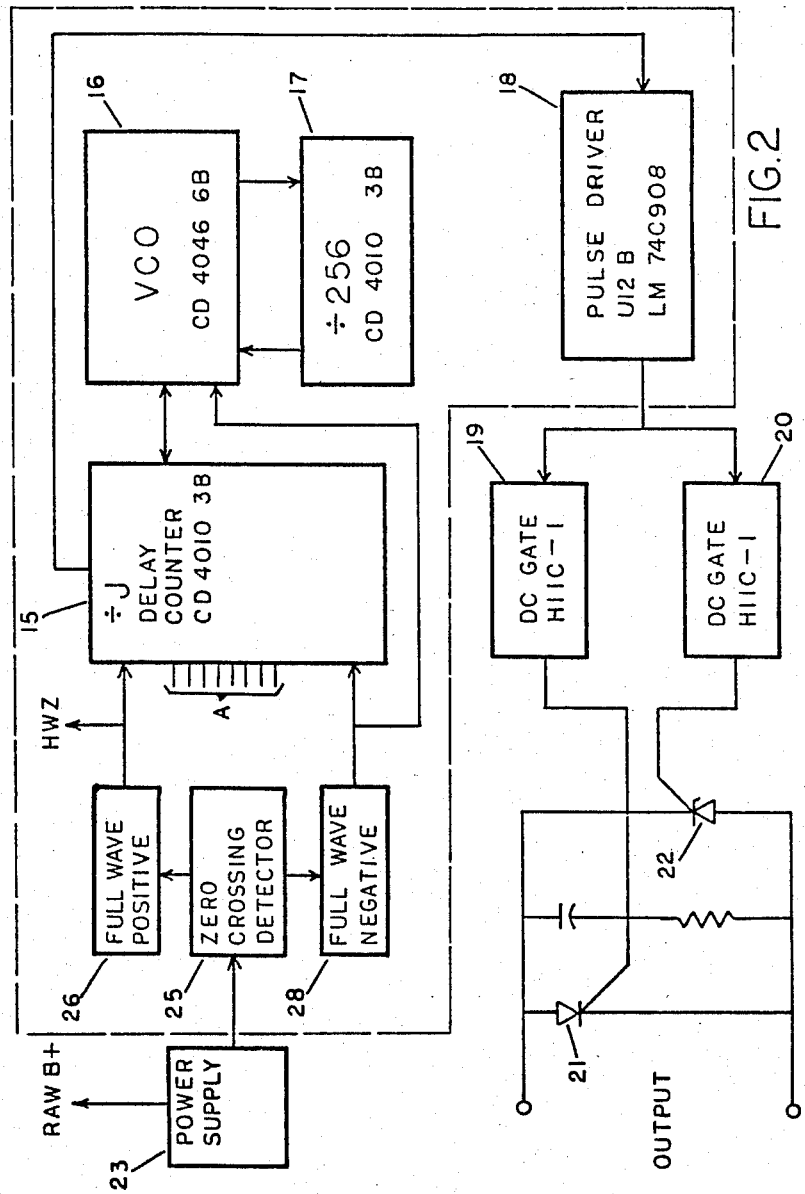

The turn-on device of this invention is shown in FIGS. 1 and 2, and comprises an amplifier 10 for receiving an input analogue command signal from a heating system. The analogue signal may be derived from a manually operated control switch, sensors, timers, and the like. A bias and gain signal is supplied to set the proper signal to the amplifier for the device.

The signal is then fed to an amplifier 11 to enable effecting a soft start (by a linear ramp) within about 4 seconds, or to effect an analogue shut down. The signal from amplifier 11 is then fed to an amplifier 12 with a current limiter input, and then to an A/D converter 13, which produces a plurality of digit signal pulses.

Digit pulses from the A/D converter 13 are then fed to a control/response PROM 14 that is programmed to provide various functions such as start signals for the heating system. The application of the PROM is to linearize the area under an input sine curve and obtain an output which is proportional to the control signal. Start signals from the PROM 14 in the form of binary phase command signals are fed to a delay counter 15 which is clocked with a VCO phase locked loop 16, 17. This obtains fine, discrete, linearized division of the sine wave signal, a typical discrete division being 1/256 half cycle. Hence, if the PROM 14 is set to turn on, for example, at 50% power, the delay counter is set to produce a firing signal one-half through the sine wave, i.e., at a divide setting of 128/256.

Obviously, if the phase locked loop produces higher or lower discrete divisions than 256 (i.e. $2^n$ divisions), a different pulse divide will be required to obtain 50% power.

The turn-on pulse is then fed to a pulse driver 18 and D.C. gates 19, 20. An output turn-on pulse from gates 19, 20 is then fed to an SCR 21 that fires for one half cycle, after which SCR 22 will fire for the other half cycle to produce an appropriate output pulse to the heater system.

Power for the delay counter 15, and the VCO phase locked loop 16, 17 is supplied by a power supply 23. Line frequency synchronization of the A/D converter, the delay counter 15, and the phase locked loop 16, 17 is obtained by supplying a reference input signal (one-half cycle) from the power supply to an amplifier 24 and to the converter. The other half cycle is supplied to the converter 13 through a zero crossing detector 25, $\overline{FWZ}$ 26, and a NAND gate 27 to divide the signal into a half cycle. This arrangement updates the converter every full cycle and ensures symmetrical cycles. Signals from $\overline{FWZ}$ 26 and FWZ 28 are fed to the delay counter. The $\overline{FWZ}$ loads the counter with the present phase command from the PROM 14 at zero cross over. The $\overline{FWZ}$ holds the counter during loading of the phase command. The phase locked loop is synchronized every half cycle by $\overline{FWZ}$ 28.

The components shown in FIGS. 1 and 2 are discrete elements, but if desired, some could be combined on a single chip, as indicated in dotted designation. Also, while the device is shown being used for a ½ cycle signal, a multi-phase signal can be accommodated by adding additional chips and detectors, or implemented with a microprocessor.

Figure 3:
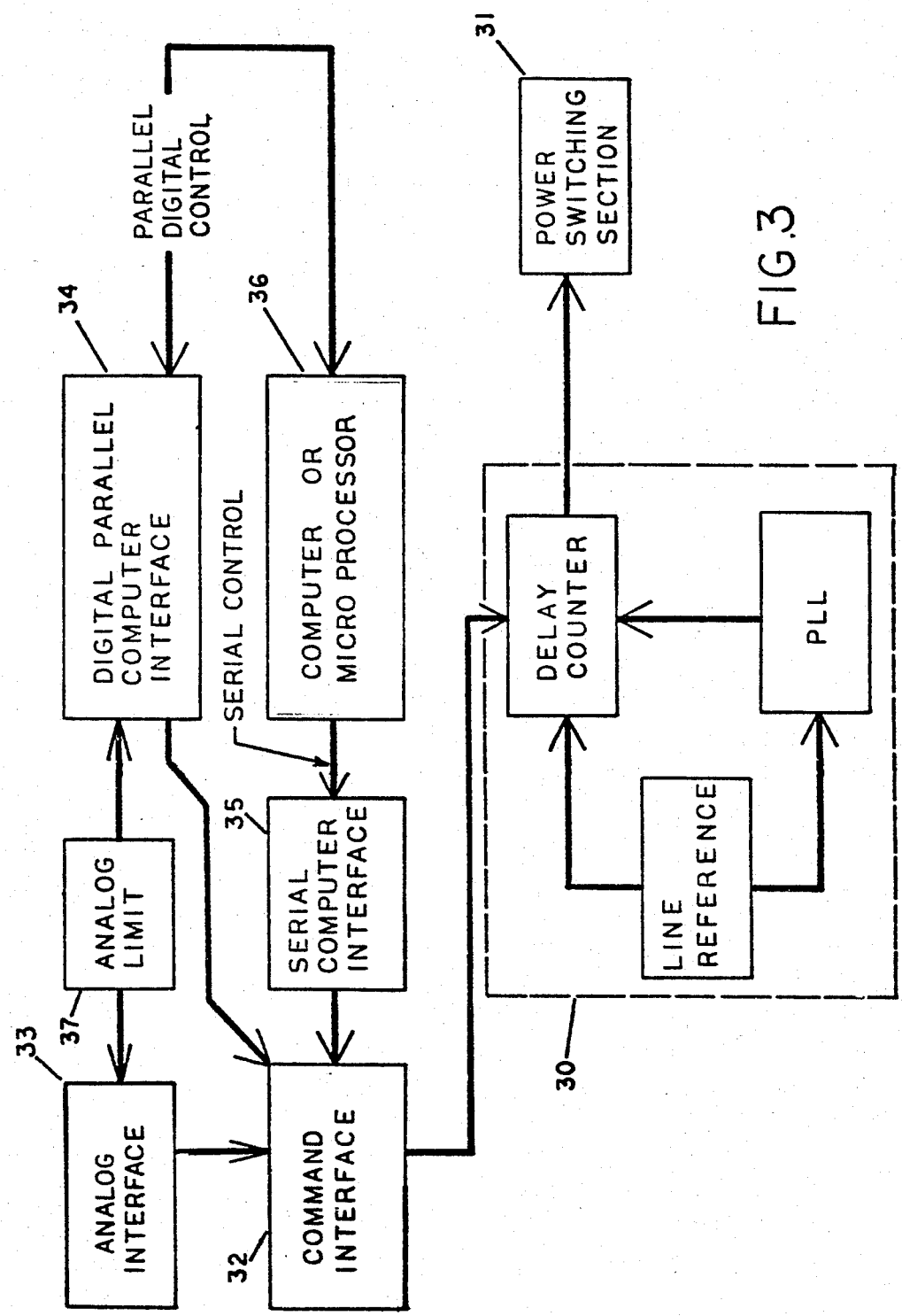

FIG. 3 illustrates, in block diagram form, various types of inputs that may be used to the device of this invention. The delay counter, line reference input and phase locked loop are shown mounted on a circuit board 30 for controlling an SCR power turn-on section 31.

One of various command interface inputs 32 (dotted designation) is shown being connected to the delay counter. These include an analogue section 33, a parallel digital computer interface 34, and a serial computer interface 35. A computer or microprocessor 36 control is connected either for parallel or serial control to the respective interfaces. An analogue limiter 37 may be employed with the analogue section 33 or the parallel digital interface 34. It will be appreciated that if a microprocessor or computer is used, a high frequency clock and timing circuitry will reside in the computer as a program rather than being wired onto the circuit board, as shown.

Where feasible, the device of this invention may be operated with present-day solid state or I.C. components at about 45 Hz–450 Hz. A practical resolution range of n (for $2^n$), with present-day solid state or I.C. components is about n=4 to 16. A divide number of 256 ($2^8$) is used because it represents an 8 bit processor, but 16 bit processors are becoming available; this would therefore yield a 1024 divide.

We claim:

1. A power control system, comprising; input command signal receiving means from a process system; means for converting the command signal to input command digital signal pulses; means for converting the digital input command signals to output digital turn-on command signals; a high frequency clock for subdividing an input power signal into $2^n$ discrete pulses; a phase delay counter for receiving the discrete pulses and the digital turn-on command signals, the phase delay counter providing a delayed pulse synchronized to a supply line frequency to generate a discrete pulse signal and synchronized with the digital turn-on command signal; and, an output firing circuit actuated by the phase delay counter upon receipt of a turn-on command signal.

2. The power control system of claim 1, in which the high frequency clock is a phase locked loop.

3. The power control system of claim 2, in which the firing circuit includes SCRs or transistors.

4. The power control system of claim 1, in which the input signal receiving means is adapted to receive an analogue signal.

5. The power control system of claim 4, including limit means for the analogue signal.

6. The power control system of claim 4, comprising line synchronization delay means, including power supply means for the system to produce a synchronized reference signal for the system; the power supply providing: i. a first half cycle reference signal to the converter and a second half cycle to the converter through a zero crossing detector, FWZ, and a NAND gate to update the converter every full cycle; ii. a positive and negative FWZ signal from the zero crossing detector to the delay counter; and, iii. an FWZ signal to the phase locked loop.

7. The power control system of claim 1, in which the high frequency clock subdivides the input power signal into 256 discrete pulses.

8. The power control system of claim 7, providing an input power clock of the system varying from about 45 Hz–450 Hz.

9. The power control system of claim 7, in which the memory means is a PROM adapted to linearize an area under an input sine wave and output linearized, discrete sine wave pulses.

10. The power control system of claim 1, including a computer for supplying input command signals to the system.

11. The power control system of claim 10, including parallel connected computer means adapted to supply the command signal, and an analogue limiter therefor.

12. The power control system of claim 10, including serial connected computer means adapted to input the command signal.

13. The power control system of claim 1, providing a divide number of $2^n$, where n=4 to 16.

14. A method for controlling a process with a power control system, comprising:

a. receiving an input command signal from the process;
b. converting the command signal to digital command signal pulses;
c. converting the input command digit pulses, with memory means, to linearized output command signals;
d. subdividing an input power signal with a high frequency clock into $2^n$ discrete pulses;
e. receiving the discrete pulses and the linearized output command signals in a phase delay counter;
f. synchronizing the line frequency with the delay counter to generate a discrete pulse signal, and synchronized with the digital command signal; and,
g. outputting a firing pulse to a firing circuit actuated by the phase delay counter upon receipt of a turn-on command signal from the memory, thereby controlling the process.

15. The method of claim 14, in which the process includes heaters, glassmaking, furnaces, petrochemical plants, or electromotive devices.

* * * * *